United States Patent
Russell

(10) Patent No.: US 10,366,476 B2
(45) Date of Patent: *Jul. 30, 2019

(54) PERSPECTIVE CORRECTION FOR CURVED DISPLAY SCREENS

(71) Applicant: NETFLIX, INC., Los Gatos, CA (US)

(72) Inventor: Michael Russell, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/786,495

(22) Filed: Oct. 17, 2017

(65) Prior Publication Data

US 2018/0040112 A1 Feb. 8, 2018

Related U.S. Application Data

(63) Continuation of application No. 15/097,055, filed on Apr. 12, 2016, now Pat. No. 9,792,674.

(Continued)

(51) Int. Cl.
*G06T 5/00* (2006.01)
*G06T 7/00* (2017.01)
(Continued)

(52) U.S. Cl.
CPC ............ *G06T 5/006* (2013.01); *G06T 7/0002* (2013.01); *G09G 3/001* (2013.01); *H04N 9/31* (2013.01);
(Continued)

(58) Field of Classification Search
CPC combination set(s) only.
See application file for complete search history.

(56) References Cited

U.S. PATENT DOCUMENTS 5,309,521 A * 5/1994 Matsukawa ........... G06T 11/203
345/442
5,408,598 A * 4/1995 Pryor, Jr. ................ G06F 17/17
345/442

(Continued)

FOREIGN PATENT DOCUMENTS

CN 105208371 A 12/2015
JP 61-031910 A 2/1986

(Continued)

OTHER PUBLICATIONS

Gao et al., "Complete Solution Classification for the Perspective-Three-Point Problem", IEEE Transactions on Pattern Analysis and Machine Intelligence, Aug. 2003, vol. 25, No. 8, pp. 930-943.

*Primary Examiner* — Tsung Yin Tsai
(74) *Attorney, Agent, or Firm* — Artegis Law Group, LLP

(57) ABSTRACT

One embodiment of the present invention sets forth a technique for performing perspective correction on one or more test images. The technique includes analyzing a first test image to detect a set of outer points and calculating a geometric plane equation based on the set of outer points. The technique further includes projecting a first set of points associated with a first curved screen model based on the geometric plane equation to generate a second set of points. The technique further includes comparing the second set of points to a set of inner points included in the first test image to determine at least one error value, and determining a screen curvature value based on the at least one error value.

22 Claims, 6 Drawing Sheets

Related U.S. Application Data

(60) Provisional application No. 62/306,577, filed on Mar. 10, 2016.

(51) Int. Cl.
*H04N 17/00* (2006.01)
*G09G 3/00* (2006.01)
*H04N 9/31* (2006.01)

(52) U.S. Cl.
CPC ......... *H04N 9/3185* (2013.01); *H04N 9/3194* (2013.01); *H04N 17/00* (2013.01); *H04N 17/004* (2013.01); *G06T 2207/20048* (2013.01); *G09G 2320/0693* (2013.01)

(56) References Cited

U.S. PATENT DOCUMENTS

| | | | |
|---|---|---|---|
| 5,500,737 A * | 3/1996 | Donaldson | G01B 11/25 356/606 |
| 7,352,913 B2 * | 4/2008 | Karuta | G02B 27/0025 348/746 |
| 9,792,674 B2 * | 10/2017 | Russell | G06T 5/006 |
| 2007/0291047 A1 * | 12/2007 | Harville | G06F 3/1446 345/589 |
| 2007/0291184 A1 * | 12/2007 | Harville | G06T 3/005 348/745 |
| 2007/0291189 A1 * | 12/2007 | Harville | G06F 3/1423 349/7 |
| 2010/0123878 A1 * | 5/2010 | Furui | G01M 11/0264 353/70 |
| 2010/0141780 A1 | 6/2010 | Tan et al. | |
| 2010/0225666 A1 * | 9/2010 | Beauchemin | G06K 9/00476 345/629 |

FOREIGN PATENT DOCUMENTS

| | | | | |
|---|---|---|---|---|
| JP | 61031910 A | * | 2/1986 | ............ G01B 11/25 |
| KR | 20100130344 A | | 12/2010 | |
| KR | 20110132835 A | | 12/2011 | |

* cited by examiner

PERSPECTIVE CORRECTION FOR CURVED DISPLAY SCREENS

CROSS-REFERENCE TO RELATED APPLICATIONS

This application is a continuation of the co-pending U.S. patent application titled, "PERSPECTIVE CORRECTION FOR CURVED DISPLAY SCREENS," filed on Apr. 12, 2016 and having Ser. No. 15/097,055, which claims priority benefit of the U.S. Provisional Patent Application titled, "PERSPECTIVE CORRECTION FOR CURVED DISPLAY SCREENS," filed on Mar. 10, 2016 and having Ser. No. 62/306,577. The subject matter of these related applications is hereby incorporated herein by reference.

BACKGROUND OF THE INVENTION

Field of the Invention

Embodiments of the present invention relate generally to audiovisual processing and, more particularly, to perspective correction for curved display screens.

Description of the Related Art

Streaming audiovisual (AV) content, such as feature length films and television programs, over the Internet has become increasingly popular as the availability of high-bandwidth Internet connections has expanded. As a result, televisions, computers, smartphones, and set-top boxes increasingly include applications that enable various types of streaming content to be downloaded and viewed. For example, a particular streaming content provider may develop and distribute a streaming content application that is capable of being executed on multiple device platforms, enabling users to view streaming content on a variety of different devices.

One obstacle commonly encountered when implementing a streaming content application across a variety of different devices is accurately testing the calibration of each device and the playback of streaming content in an automated fashion. In particular, because different types of devices have unique hardware characteristics, different devices generally have different playback characteristics as well that impact how the streaming content is displayed on those devices. For example, different television models may have different audio delays, effective resolutions, processing speeds, screen geometries, etc. Consequently, a separate calibration process is typically manually performed for each device model on which a streaming content application is to be implemented to enable the streaming content to be displayed properly on each such device model.

A common technique for calibrating a device is to play a calibration sequence on the device (e.g., via a streaming content application) and record the audio and video output of the device via a camera. However, in order to properly calibrate the device, images of the screen must be accurately captured by the camera, without generating significant distortions. Because the camera typically cannot be perfectly aligned with the display of the device being calibrated, most conventional calibration techniques include perspective correction operations on the captured images before analyzing the images for calibration. These steps are performed to compensate for the camera being tilted, off-angle, and/or too far relative to the display of the device being calibrated.

One drawback of these types of conventional calibration techniques is that, although the techniques are reasonably effective in mitigating camera alignment problems, conventional techniques cannot accurately correct for geometric distortions that are present in devices having curved display screens. As a result, when a calibration algorithm developed for a flat screen display is applied to calibrate a curved screen display, the results are typically inaccurate. Consequently, a custom calibration algorithm must be developed for the specific curvature value of the curved display screen to be calibrated. However, because there are hundreds, if not thousands, of different curvature values implemented across different device brands and models, writing a separate calibration algorithm for each type of curved display would be infeasible.

As the foregoing illustrates, improved techniques for calibrating a curved display screen would be useful.

SUMMARY OF THE INVENTION

One embodiment of the present invention sets forth a method for performing perspective correction on one or more test images. The technique includes analyzing a first test image to detect a set of outer points and calculating a geometric plane equation based on the set of outer points. The technique further includes projecting a first set of points associated with a first curved screen model based on the geometric plane equation to generate a second set of points. The technique further includes comparing the second set of points to a set of inner points included in the first test image to determine at least one error value, and determining a screen curvature value based on the at least one error value.

Further embodiments provide, among other things, a non-transitory computer-readable medium and a computing device configured to implement the method set forth above.

At least one advantage of the disclosed techniques is that images of a curved display screen can be corrected to remove the geometric distortion of calibration images being shown on the curved display screen. Further, because the calibration images being shown on a curved display screen can be flattened (i.e., by removing the geometric distortion), the same calibration algorithm can be used to accurately calibrate both flat screen displays and a wide variety of displays having different curvature values. Consequently, instead of requiring a different calibration algorithm to be developed for each possible screen curvature value, a single calibration algorithm can be implemented across different device brands and models.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
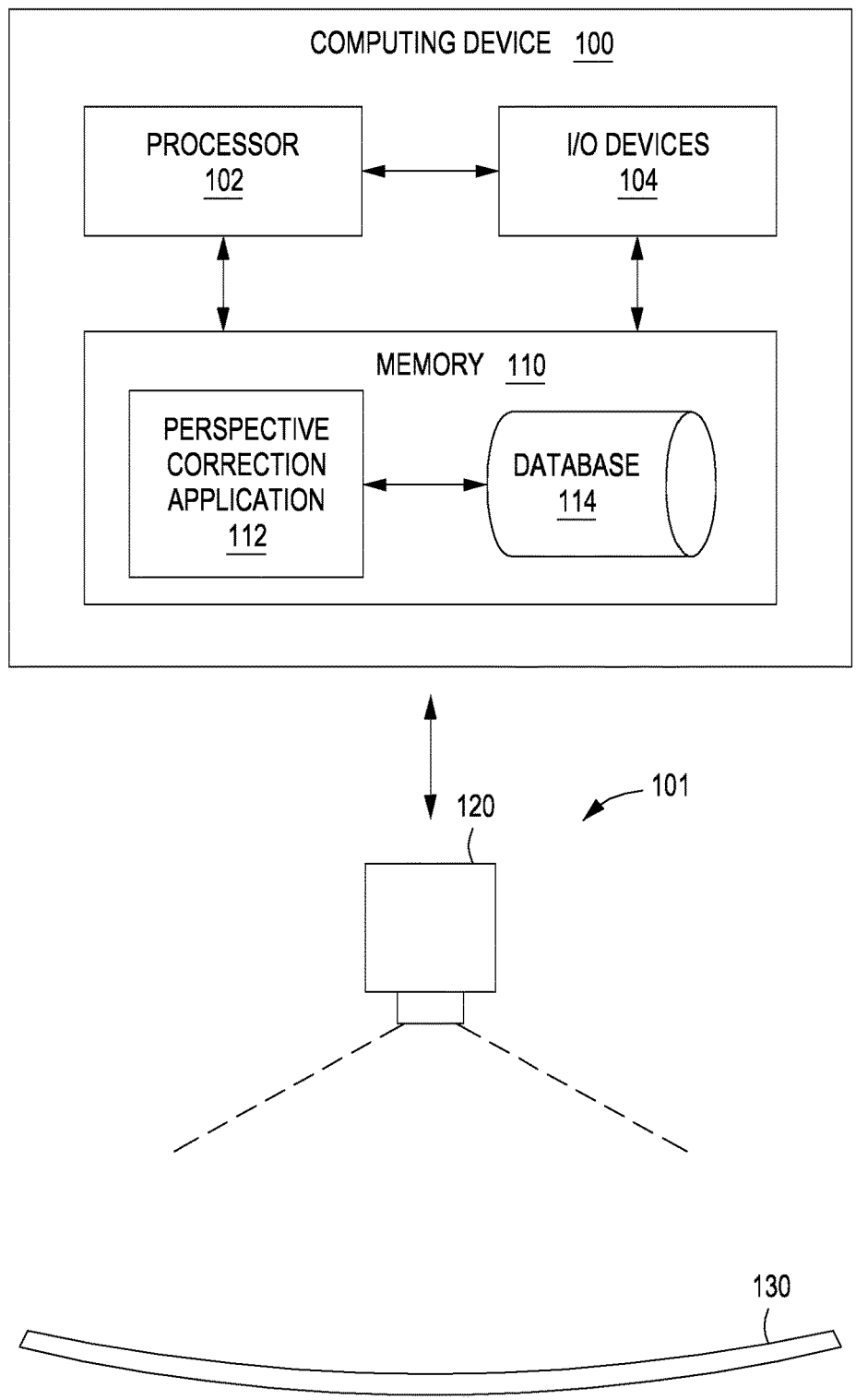
FIG. 1 illustrates a conceptual block diagram of a perspective correction system configured to implement one or more aspects of the present invention.

FIG. 1 illustrates a conceptual block diagram of a perspective correction system configured to implement one or more aspects of the present invention. As shown, the perspective correction system 101 includes a computing device 100 and a camera 120. The computing device 100 includes a processor 102, input/output (I/O) devices 104, and a memory 110. The memory 110 includes a perspective correction application 112 configured to interact with a database 114.

The processor 102 may be any technically feasible form of processing device configured to process data and execute program code. The processor 102 could be, for example, and without limitation, a central processing unit (CPU), a graphics processing unit (GPU), an application-specific integrated circuit (ASIC), a digital signal processor (DSP), a field-programmable gate array (FPGA), and so forth.

Memory 110 may include a memory module or a collection of memory modules. The perspective correction application 112 within memory 110 is executed by the processor 102 to implement the overall functionality of the perspective correction system 101. For example, and without limitation, images of a curved display screen 130 acquired via the camera 120 may be processed by the perspective correction application 112 to determine a curvature value of the curved display screen 130 and/or to generate perspective correction values. The processing performed by the perspective correction application 112 may include, for example, and without limitation, image recognition techniques, transformations, and/or other types of image processing. Database 114 within memory 110 may store test patterns (e.g., one or more checkerboard patterns), 2D models and/or 3D models of flat display screens and/or curved display screens, and data associated with such test patterns and models.

I/O devices 104 may include input devices, output devices, and devices capable of both receiving input and providing output. For example, and without limitation, I/O devices 104 could include wired and/or wireless communication devices that send data to and/or receive data from the camera 120, the display screen 130, speakers, a microphone, and/or another computing device.

Generally, computing device 100 is configured to coordinate the overall operation of the perspective correction system 101. In other embodiments, the computing device 100 may be coupled to, but separate from other components of the perspective correction system 101. However, the embodiments disclosed herein contemplate any technically feasible system configured to implement the functionality of the perspective correction system 101.

Figure 2:
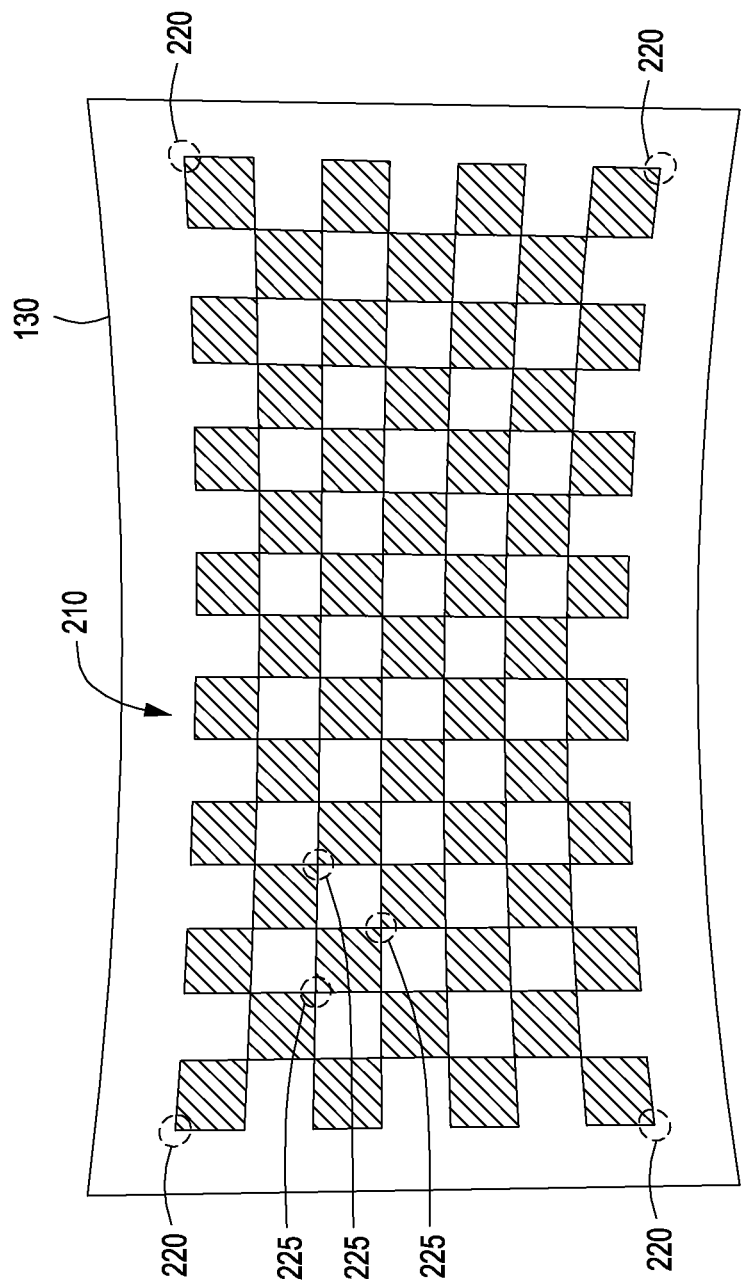
FIG. 2 is a conceptual illustration of a device having a curved display screen displaying a test pattern, according to various embodiments of the present invention.

FIG. 2 is a conceptual illustration of a device having a curved display screen 130 displaying a test pattern 210, according to various embodiments of the present invention. As shown, the test pattern 210 may be generated by the perspective correction application 112 and outputted to the curved display screen 130, which may be coupled to and/or integrated with the computing device 100. In some embodiments, the computing device 100 is separate from the curved display screen 130, which may be coupled to and/or integrated with a different computing device.

The test pattern 210 includes a checkerboard pattern having multiple outer points 220 and multiple inner points 225. Although the test pattern 210 shown in FIG. 2 includes a checkerboard pattern, in other embodiments, any other type of test pattern 210 having contrasting regions that form identifiable shapes or points (e.g., outer points 220 and inner points 225) may be implemented by the perspective correction application 112. For example, in some embodiments, the test pattern may include circular regions, rectangular regions, triangular regions, lines, and/or any other type of geometrical or abstract design that provides multiple points of reference.

In general, when the test pattern 210 is displayed on the curved display screen 130, geometric distortions may be visible from the perspective of the user and/or camera 120. For example, as shown in FIG. 2, when the center of the curved display screen 130 is curved away from the user or camera 120, the center of the test pattern 210 appears squeezed relative to the outer edges of the test pattern 210. Further, other types of geometric distortions may be generated by other types of curved display screens. For clarity of illustration, the geometric distortions of the test pattern 210 have been exaggerated in FIGS. 2, 3A, 3B, and 3E.

FIGS. 3A-3F illustrate a technique for performing perspective correction on an image 305 of a test pattern 210 displayed on a curved display screen 130, according to various embodiments of the present invention.

As described above, when a camera is not properly aligned with a display screen that is displaying a test pattern 210, the resulting image of the test pattern 210 acquired via the camera 120 may include various types of geometric distortion. For example, the image 305 of the curved display screen 130 shown in FIG. 3A was acquired via a camera 120 that was tilted relative to curved display screen 130. Additionally, because the camera 120 was positioned too far away from the curved display screen 130, the test pattern 210 being displayed on the curved display screen 130 occupies only a portion of the image 130. Furthermore, because the test pattern 210 is being displayed on a curved display screen 130, the center of the test pattern 210 appears distorted relative to the outer edges of the test pattern 210.

Although conventional perspective correction techniques are able to correct for minor geometric distortion resulting from misalignment of a camera with a flat display screen, such techniques are unable to accurately detect or correct for the more complex geometric distortion that results from displaying a test pattern 210 on a curved display screen 130. As a result, curved screen devices that are calibrated (e.g., audio-video sync calibration, image scaling calibration, image geometry calibration, etc.) based on images processed via conventional perspective correction techniques may suffer from various types of performance issues as a result of calibration inaccuracies.

Accordingly, in various embodiments, the perspective correction application 112 is configured to detect the locations of reference points included in an image 305 of a curved display screen 130 that is displaying a test pattern 210. The perspective correction application 112 then compares the locations of those reference points to the expected locations of corresponding reference points on one or more computer-generated curved display screen models. Various techniques for performing perspective correction with curved screen displays are described below in further detail in conjunction with FIGS. 3A-3F and 4.

Figure 3A:
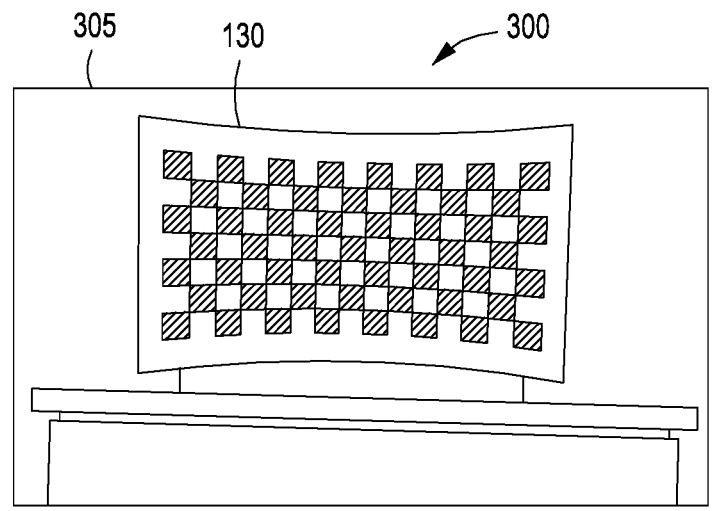
FIGS. 3A-3F illustrate a technique for performing perspective correction on an image of a test pattern displayed on a curved display screen, according to various embodiments of the present invention.
Figure 3B:
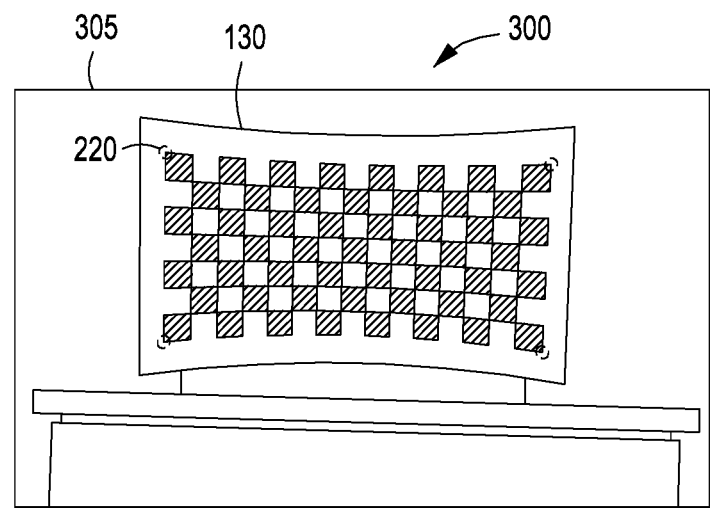
Figure 3C:
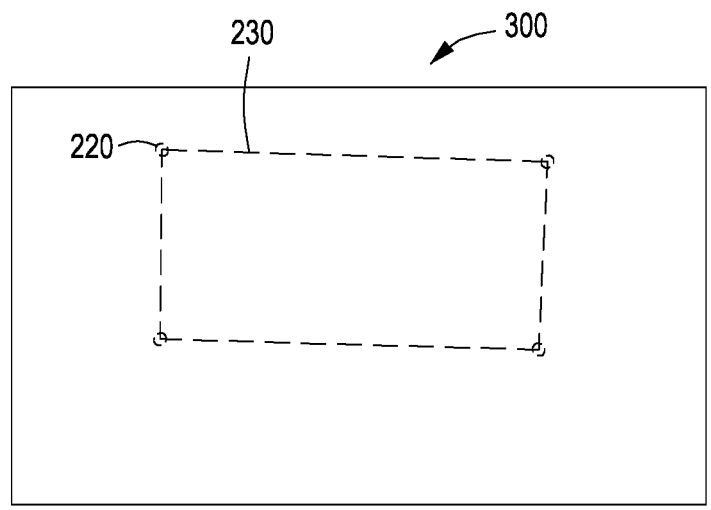
Figure 3D:
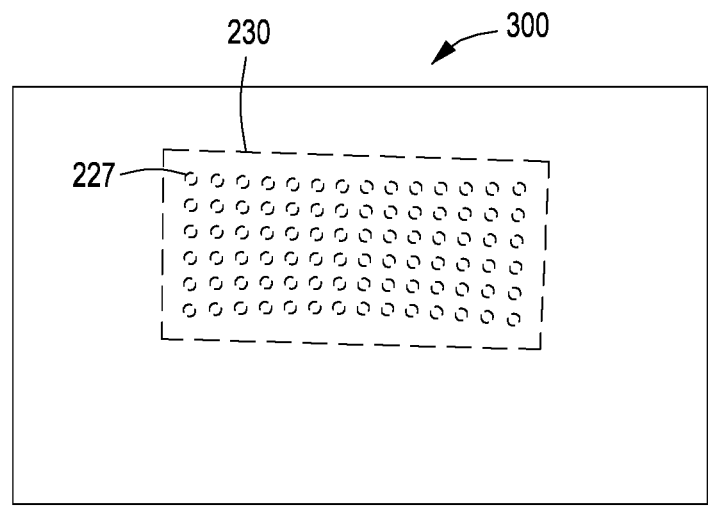
Figure 3E:
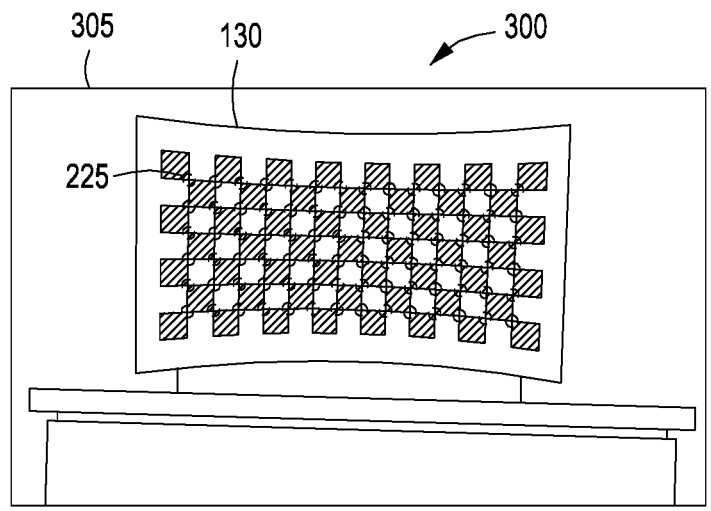
Figure 3F:
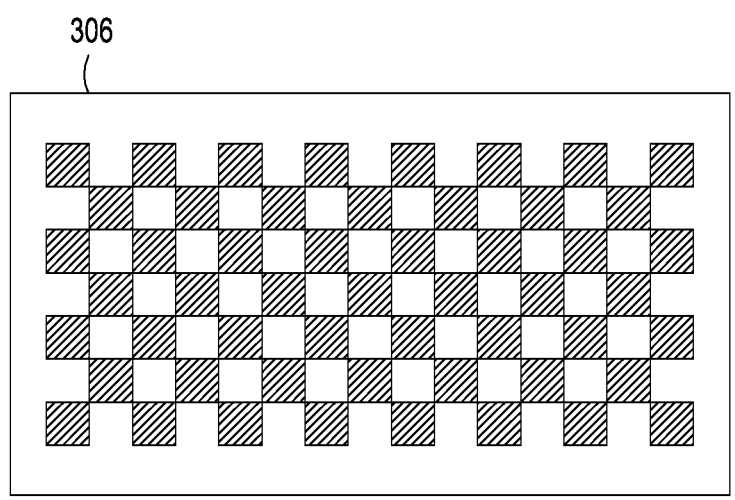
Figure 4:
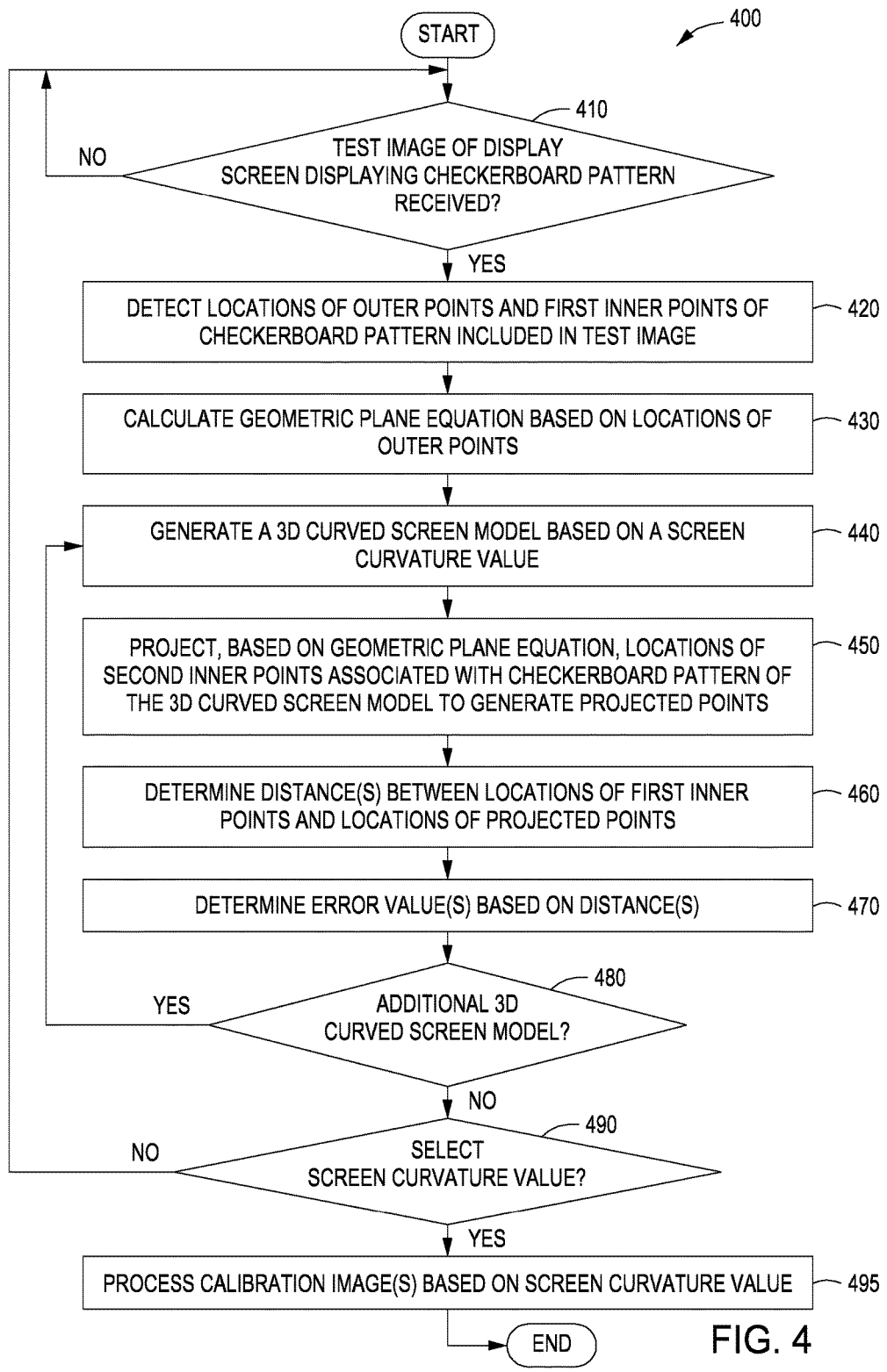
FIG. 4 illustrates a flow diagram of method steps for performing perspective correction on an image of a curved screen display, according to various embodiments of the present invention.

FIG. 4 illustrates a flow diagram of method steps for performing perspective correction on an image 305 of a curved screen display 130, according to various embodiments of the present invention. Although the method steps are described in conjunction with the systems of FIGS. 1-3F, persons skilled in the art will understand that any system configured to perform the method steps, in any order, falls within the scope of the present invention.

As shown in FIG. 4, a method 400 begins at step 410, where the perspective correction application 112 receives a test image 305 of a display screen and analyzes the test image 305 to determine whether a test pattern 210 is visible in the test image 305. If a test pattern 210 is visible in the test image 305, then the method 400 proceeds to step 420. If a test pattern 210 is not visible in the test image 305, then the method 400 repeats 410, where the perspective correction application 112 receives and analyzes another test image 305 to determine whether a test pattern 210 is visible in the image 305.

For example, as shown in FIG. 3A, at step 410, the perspective correction application 112 could receive a test image 305 of a curved display screen 130. The perspective correction application 112 would then analyze the test image 305 and determine that a checkboard pattern 210—displayed on the curved display screen 130—is present in the test image 305.

At step 420, the perspective correction application 112 detects the locations of an outer set of reference points and an inner set of reference points shown in the test image 305. Then, at step 430, the perspective correction application 112 generates a geometric plane equation 230 (e.g., a two-dimensional (2D) transformation matrix) based on the locations of the outer set of reference points within the image 305. In various embodiments, the geometric plane equation 230 indicates the location of the curved display screen 130 in world space, which may be the space (e.g., an office, a laboratory, a factory, etc.) in which the image 305 was captured, relative to the location of the camera 305. In some embodiments, the geometric plane equation 230 is generated by solving the 3D/2D point correspondence problem for at least three of the outer corners 220 detected in the test image 305. In general, however, any mathematical technique may be used to generate a geometric plane equation 230 based on three or more of the outer corners 220.

For example, as shown in FIG. 3B, at step 420, the perspective correction application 112 could detect the locations of three or more of the outer corners 220 of the checkboard pattern 210 and one or more inner corners 225 of the checkerboard pattern 210. Then, at step 430, the perspective correction application 112 would use these locations of the outer corners 220 to generate the geometric plane equation 230 shown in FIG. 3C.

Next, at step 440, the perspective correction application 112 generates a 3D curved screen model having a specific curvature value. The curvature value associated with the 3D curved screen model may range from approximately 0.01 degrees to approximately 5 degrees. In various embodiments, each 3D curved screen model generated by the perspective correction application 112 is a three-dimensional (3D) model on which the test pattern 210 (or reference points associated with the test pattern 210) is disposed. For example, each 3D curved screen model may include a curved surface having a different curvature value and an aspect ratio that corresponds to the aspect ratio of the curved display screen 130 (e.g., 16:9, 4:3, 21:9, etc.), where the checkerboard pattern 210 is mapped edge-to-edge on the curved surface in a manner substantially the same as illustrated in FIG. 2.

At step 450, the perspective correction application 112 projects the inner points 225 of the test pattern 210 included in the 3D curved screen model from world space into screen space based on the geometric plane equation 230. For example, at step 450, the perspective correction application 112 could invert a 2D transformation matrix associated with the geometric plane equation 230 and apply the resulting transform to the 3D curved screen model, aligning the outer points 220 included in the 3D curved screen model with the corresponding outer points 220 included in the test image 305. Once the 3D curved screen model is aligned with the test pattern 210 shown in the test image 305, the perspective correction application 112 would then project the inner points 225 of the 3D curved screen model onto the image space of the test image 305 in order to generate a set of projected points 227, as shown in FIG. 3D.

At step 460, the perspective correction application 112 determines a distance between each projected point 227, shown in FIG. 3D, and the location of a corresponding inner point 225 included in the test pattern 210, shown in FIG. 3E. Then, at step 470, the perspective correction application 112 determines an error value based on the distances calculated at step 460. In some embodiments, the perspective correction application 112 could compute an aggregate error value by summing the distances, by summing the squares of each distance, or by performing any other type of statistical analysis calculation.

At step 480, the perspective correction application 112 determines whether steps 440-470 should be performed with respect to an additional 3D curved screen model having a different curvature value. In some embodiments, steps 440-470 are performed by the perspective correction application 112 for each of multiple curvature values. For example, the perspective correction application 112 could perform steps 440-470 for all possible curvature values between 0 degrees (i.e., a flat screen) and 5 degrees in an increment such as 0.1 degrees or 0.01 degrees.

At step 490, the perspective correction application 112 compares the aggregate error values associated with each 3D curved screen model in order to determine whether a screen curvature value has been accurately determined. In various embodiments, at step 490, the perspective correction application 112 could compare the aggregate error values associated with the 3D curved screen models to determine the curvature values having the lowest error value(s) (e.g., lowest aggregate error value). The perspective correction application 112 would then select the curvature value associated with the lowest error value as the mostly likely curvature value of the curved display screen 130 included in the test image 305, and the method 400 would proceed to step 495.

In other embodiments, at step 490, the perspective correction application 112 determines whether to select a screen curvature value by determining whether (1) one or more error values associated with a 3D flat screen model (i.e., having a curvature value of zero) are less than the lowest error value associated with the 3D curved screen models, and (2) either the error value(s) associated with a 3D flat screen model or the lowest error value associated with the 3D curved screen models is lower than a predetermined threshold value. If neither the error value(s) associated with a 3D flat screen model nor the lowest error value associated with the 3D curved screen models is lower than the predetermined threshold value, then the method 400 would return to step 410, where the perspective correction application 112 would receive an additional test image 305. If, on the other hand, both criteria are met, then the method 400 would proceed to step 495.

At step 495, the perspective correction application 112 processes one or more calibration images based on the curvature value determined at step 490. The method 400 then terminates. As an example, at step 495, if the perspective correction application 112 were to perform perspective correction on the test image 305 itself based on the curvature value, then the full-screen, distortion-free (flattened) image 306 of the checkerboard pattern 210 shown in FIG. 3F would be generated.

In some embodiments, after selecting a curvature value of the curved display screen 130 at step 490, the perspective correction application 112 builds a lookup table to enable the perspective correction application 112 to do real-time correction of incoming calibration images at step 495. For example, the perspective correction application 112 could generate 3D curved screen model having the selected curvature value, where each point on the 3D curved screen model corresponds to a different pixel on the curved display screen 130. Then, the perspective correction application 112 could reverse project each point on the 3D curved screen model back into screen space in order to build a lookup table enables real-time perspective correction. The perspective correction application 112 would then use the lookup table at step 495 to correct for geometric distortion present in incoming calibration images.

Although the method 400 is described with respect to outer points 220 and inner points 225, the perspective correction application 112 may use any type of reference points located anywhere in the test image 305 to generate a geometric plane equation 230. Additionally, any type of reference points having any location on a 3D curved screen model and/or within a test image 305 may be used to project reference point locations from 3D world space to image space and/or from image space to 3D world space.

In sum, a perspective correction application receives a test image of a curved display screen and identifies a test pattern included in the test image. The perspective correction application then detects the locations of a first set of reference points included in the test pattern to generate a geometric plane equation that reflects the location of the curved display screen in world space. Next, the perspective correction application generates multiple 3D models of curved screens, each having a different curvature value. The perspective correction application then projects, based on the geometric plane equation, a second set of reference points associated with each 3D model from world space into a screen space associated with the image in order to generate sets of projected points. The perspective correction application measures the distances between each set of projected points and a corresponding set of points included in the test pattern shown in the test image. Finally, the perspective correction application selects a screen curvature value based on the calculated distances and corrects for geometric distortion of incoming calibration images based on the selected screen curvature value.

At least one advantage of the disclosed techniques is that images of a curved display screen can be corrected to remove the geometric distortion of calibration images being shown on the curved display screen. Further, because the calibration images being shown on a curved display screen can be flattened (i.e., by removing the geometric distortion), the same calibration algorithm can be used to accurately calibrate both flat screen displays and a wide variety of displays having different curvature values. Consequently, instead of requiring a different calibration algorithm to be developed for each possible screen curvature value, a single calibration algorithm can be implemented across different device brands and models.

1. In some embodiments, a non-transitory computer-readable storage medium includes instructions that, when executed by a processor, cause the processor to perform the steps of: analyzing a first test image to detect a first set of points; calculating a geometric plane equation based on the first set of points; projecting a second set of points onto a first curved screen model based on the geometric plane equation to generate a third set of points; comparing the third set of points to a fourth set of points included in the first test image to determine at least one error value; and determining a screen curvature value based on the at least one error value.

2. The non-transitory computer-readable storage medium of clause 1, further comprising transforming a sequence of calibration images based on the screen curvature value to generate a sequence of transformed images.

3. The non-transitory computer-readable storage medium of clauses 1 or 2, further comprising performing one or more calibration procedures based on the sequence of transformed images.

4. The non-transitory computer-readable storage medium of any of clauses 1-3, wherein comparing the third set of points to the fourth set of points comprises, for each point included in the third set of points, calculating a distance to a corresponding point included in the fourth set of points to determine an individual error value, and further comprising determining a first aggregate error value based on the individual error values.

5. The non-transitory computer-readable storage medium of any of clauses 1-4, further comprising: projecting a fifth set of points associated with a second curved screen model based on the geometric plane equation to generate a sixth set of points, wherein a first screen curvature value of the first curved screen model is different than a second screen curvature value of the second curved screen model; comparing the sixth set of points to the fourth set of points included in the first test image to determine a second aggregate error value.

6. The non-transitory computer-readable storage medium of any of clauses 1-5, further comprising: projecting a seventh set of points associated with a flat screen model based on the geometric plane equation to generate an eighth set of points; comparing the eighth set of points to the fourth set of points included in the first test image to determine a third aggregate error value.

7. The non-transitory computer-readable storage medium of any of clauses 1-6, wherein determining the screen curvature value comprises: comparing the first aggregate error value, the second aggregate error value, and the third aggregate error value to determine a lowest aggregate error value; selecting the screen curvature value associated with the lowest aggregate error value; and transforming at least one image based on the screen curvature value to generate a transformed image.

8. The non-transitory computer-readable storage medium of any of clauses 1-7, wherein the test image comprises a checkerboard pattern displayed on a curved display screen.

9. The non-transitory computer-readable storage medium of any of clauses 1-8, wherein the first set of points comprises at least three outer points of the checkerboard pattern, and the fourth set of points comprises a plurality of inner points of the checkerboard pattern.

10. In some embodiments a method, comprises: analyzing a first test image to detect a set of outer points; calculating a geometric plane equation based on the set of outer points; projecting a first set of points associated with a first curved screen model based on the geometric plane equation to generate a second set of points; comparing the second set of points to a set of inner points included in the first test image to determine at least one error value; and determining a screen curvature value based on the at least one error value.

11. The method of clause 10, further comprising transforming a sequence of calibration images based on the screen curvature value to generate a sequence of transformed images.

12. The method of clause 10 or 11, further comprising performing one or more calibration procedures based on the sequence of transformed images.

13. The method of any of clauses 10-12, wherein comparing the second set of points to the set of inner points comprises, for each point included in the second set of points, calculating a distance to a corresponding point included in the set of inner points to determine an individual error value, and further comprising determining a first aggregate error value based on the individual error values.

14. The method of any of clauses 10-13, further comprising: projecting a third set of points associated with a second curved screen model based on the geometric plane equation to generate a fourth set of points, wherein a first screen curvature value of the first curved screen model is different than a second screen curvature value of the second curved screen model; comparing the fourth set of points to the set of inner points included in the first test image to determine a second aggregate error value.

15. The method of any of clauses 10-14, further comprising: projecting a fifth set of points associated with a flat screen model based on the geometric plane equation to generate an sixth set of points; comparing the sixth set of points to the set of inner points included in the first test image to determine a third aggregate error value.

16. The method of any of clauses 10-15, wherein determining the screen curvature value comprises: comparing the first aggregate error value, the second aggregate error value, and the third aggregate error value to determine a lowest aggregate error value; selecting the screen curvature value associated with the lowest aggregate error value; and transforming at least one image based on the screen curvature value to generate a transformed image.

17. The method of any of clauses 10-16, wherein the test image comprises a pattern displayed on a curved display screen.

18. The method of any of clauses 10-17, wherein the set of outer points comprises at least three points of the pattern, and the set of inner points comprises a plurality of points of the pattern that are located within the set of outer points.

19. In some embodiments, a computing device, comprises: a memory storing a perspective correction application; and a processor that is coupled to the memory and, when executing the perspective correction application, is configured to: analyze a first test image to detect a first set of points; calculate a transformation matrix based on the first set of points; project a second set of points associated with a first curved screen model based on the transformation matrix to generate a third set of points; compare the third set of points to a fourth set of points included in the first test image to determine at least one error value; determine a screen curvature value based on the at least one error value; and transform a sequence of calibration images based on the screen curvature value to generate a sequence of transformed images.

20. The computing device of clause 19, wherein comparing the third set of points to the fourth set of points comprises, for each point included in the third set of points, calculating a distance to a corresponding point included in the fourth set of points to determine an individual error value, and further comprising determining a first aggregate error value based on the individual error values.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to perform the steps of:
    calculating a plane equation based on a first set of points associated with a first test image;
    generating a first curved screen model based on a first screen curvature value;
    projecting a second set of points onto the first curved screen model based on the plane equation to generate a third set of points;
    comparing the third set of points to the first test image to determine an error value; and
    determining a final screen curvature value based on the error value.

2. The non-transitory computer-readable storage medium of claim 1, further comprising transforming a sequence of calibration images based on the final screen curvature value to generate a sequence of transformed images.

3. The non-transitory computer-readable storage medium of claim 2, further comprising performing one or more calibration procedures based on the sequence of transformed images.

4. The non-transitory computer-readable storage medium of claim 1, wherein comparing the third set of points to the test image, comprises, for each point included in the third set of points, calculating a distance to a corresponding point included in the test image to determine an individual error value, and further comprising determining the error value based on the individual error values.

5. The non-transitory computer-readable storage medium of claim 1, further comprising:
    generating a second curved screen model based on a second screen curvature value;
    projecting a fifth set of points onto the second curved screen model based on the geometric plane equation to generate a sixth set of points; and
    comparing the sixth set of points to the first test image to determine a second error value.

6. The non-transitory computer-readable storage medium of claim 5, further comprising:
    generating a third curved screen model based on a third screen curvature value;
    projecting a seventh set of points onto the third curved screen model based on the geometric plane equation to generate an eighth set of points;
    comparing the eighth set of points to the first test image to determine a third error value.

7. The non-transitory computer-readable storage medium of claim 6, wherein determining the final screen curvature value comprises:
    comparing the first error value, the second error value, and the third error value to determine a lowest error value; and
    selecting a screen curvature value associated with the lowest error value to be the final screen curvature value.

8. The non-transitory computer-readable storage medium of claim 7, further comprising transforming at least one image based on the final screen curvature value to generate a transformed image.

9. The non-transitory computer-readable storage medium of claim 1, wherein the test image comprises a checkerboard pattern displayed on a curved display screen.

10. The non-transitory computer-readable storage medium of claim 9, wherein the first set of points comprises at least three outer points of the checkerboard pattern, and the fourth set of points comprises a plurality of inner points of the checkerboard pattern.

11. A method, comprising:
    calculating a plane equation based on a first set of points associated with a first test image;
    generating a first curved screen model based on a first screen curvature value;
    projecting a second set of points onto the first curved screen model based on the plane equation to generate a third set of points; and
    determining a final screen curvature value based on the third set of points and the first test image.

12. The method of claim 11, further comprising transforming a sequence of calibration images based on the final screen curvature value to generate a sequence of transformed images.

13. The method of claim 12, further comprising performing one or more calibration procedures based on the sequence of transformed images.

14. The method of claim 11, further comprising comparing the third set of points to the first test image to determine an error value, wherein comparing the third set of points to the test image, comprises, for each point included in the third set of points, calculating a distance to a corresponding point included in the test image to determine an individual error value, and further comprising determining the error value based on the individual error values.

15. The method of claim 11, further comprising:
    comparing the third set of points to the first test image to determine a first error value;
    generating a second curved screen model based on a second screen curvature value;
    projecting a fifth set of points onto the second curved screen model based on the geometric plane equation to generate a sixth set of points; and
    comparing the sixth set of points to the first test image to determine a second error value.

16. The method of claim 15, further comprising:
    generating a third curved screen model based on a third screen curvature value;

projecting a seventh set of points onto the third curved screen model based on the geometric plane equation to generate an eighth set of points;

comparing the eighth set of points to the first test image to determine a third error value.

17. The method of claim 16, wherein determining the final screen curvature value comprises:

comparing the first error value, the second error value, and the third error value to determine a lowest error value; and selecting a screen curvature value associated with the lowest error value to be the final screen curvature value.

18. The method of claim 17, further comprising transforming at least one image based on the final screen curvature value to generate a transformed image.

19. The method of claim 11, wherein the test image comprises a checkerboard pattern displayed on a curved display screen.

20. The method of claim 19, wherein the first set of points comprises at least three outer points of the checkerboard pattern, and the fourth set of points comprises a plurality of inner points of the checkerboard pattern.

21. A computing device, comprising:

a memory storing a perspective correction application; and a processor that is coupled to the memory and, when executing the perspective correction application, is configured to:

calculate a transformation matrix based on a first test image;

project a first set of points onto a first curved screen model based on the transformation matrix to generate a second set of points; and determine a final screen curvature value based on the second set of points and the first test image.

22. The computing device of claim 21, wherein the processor is further configured to transform a sequence of calibration images based on the final screen curvature value to generate a sequence of transformed images.

* * * * *